Oct. 8, 1968  A. SUTARUK  3,404,832
FLUID COUPLING
Filed Dec. 6, 1966  2 Sheets-Sheet 1

INVENTOR
ALEX SUTARUK
BY Yount, Raney, Flynn, & Tarolli
ATTORNEYS

Oct. 8, 1968

A. SUTARUK 3,404,832

FLUID COUPLING

Filed Dec. 6, 1966

INVENTOR.
ALEX SUTARUK

BY Yount, Raney, Flynn, & Tarolli

ATTORNEYS

United States Patent Office 3,404,832
Patented Oct. 8, 1968

3,404,832
FLUID COUPLING
Alex Sutaruk, Hazel Park, Mich., assignor to Eaton Yale & Towne Inc., Cleveland, Ohio, a corporation of Ohio
Filed Dec. 6, 1966, Ser. No. 599,639
14 Claims. (Cl. 230—270)

ABSTRACT OF THE DISCLOSURE

Disclosed herein is a fluid coupling assembly which is used for driving a fan and includes input and output members having surfaces located in a chamber holding a fluid shear medium. The output member forms an integral unit with blades of the fan to promote a dissipation of heat from the working chamber by the fan blades. The input member is releasably coupled to a drive shaft to enable the input member to slip relative to the drive shaft in response to a condition of operation of the coupling assembly. One of the members is formed of a resilient material to enable the member to be readily deflected relative to the other member to minimize the transmission of wobble inducing forces between the members.

---

The present invention relates to fluid couplings and more particularly to fluid couplings wherein a fluid shear medium disposed between relatively rotatable input and output coupling members transmits torque between the members. Fluid couplings of the above noted type are applicable for driving various types of load devices and have particular utility for driving an engine accessory such as a cooling fan of an internal combustion engine.

It is an important object of the present invention to provide a new and improved fluid coupling for driving a fan and wherein a portion of the fan forms an integral part of the coupling and which coupling is of a compact design, inexpensive to manufacture and provides for good dissipation of heat from the coupling.

Another object of the present invention is to provide a new and improved fluid coupling for driving a fan and wherein part of the fan forms a part of the boundary of a fluid working chamber which is adapted to contain fluid which transmits drive between the coupling members and wherein the part of the fan is effective to dissipate heat in the working chamber to air flowing about the blades of the fan.

A further object of the present invention is the provision of a new and improved fluid coupling for driving a fan and wherein part of the fan is arranged in spaced opposed relationship to part of the input coupling member and wherein a fluid shear medium between the part of the fan and the part of the input coupling member transmits torque between the parts providing a direct fluid drive between the input coupling member and the fan.

A further object of the present invention is to provide a new and improved fluid coupling having an output coupling member and an input coupling member including a resilient part arranged relative to the output coupling member whereby less wobble inducing forces resulting from deviation of the input coupling member from its normal plane of rotation will be transmitted by the resilient part to the output coupling member.

A still further object of the present invention is the provision of a new and improved fluid coupling wherein a safety mechanism is provided for releasably connecting the input coupling member to a drive shaft so that when a direct drive is established between the coupling members due to a malfunction, such as, for example, seizure of the coupling members or polymerization of the fluid due to excessive heat therein, the input coupling member slips relative to the drive shaft thereby minimizing structural damage to the coupling members and permitting the coupling members to be constructed from lower strength materials.

Further objects and advantages of the present invention will be apparent to those skilled in the art to which it relates from the following detailed description of preferred embodiments thereof made with reference to the accompanying drawings forming a part of this specification, and in which.

Figure 1:
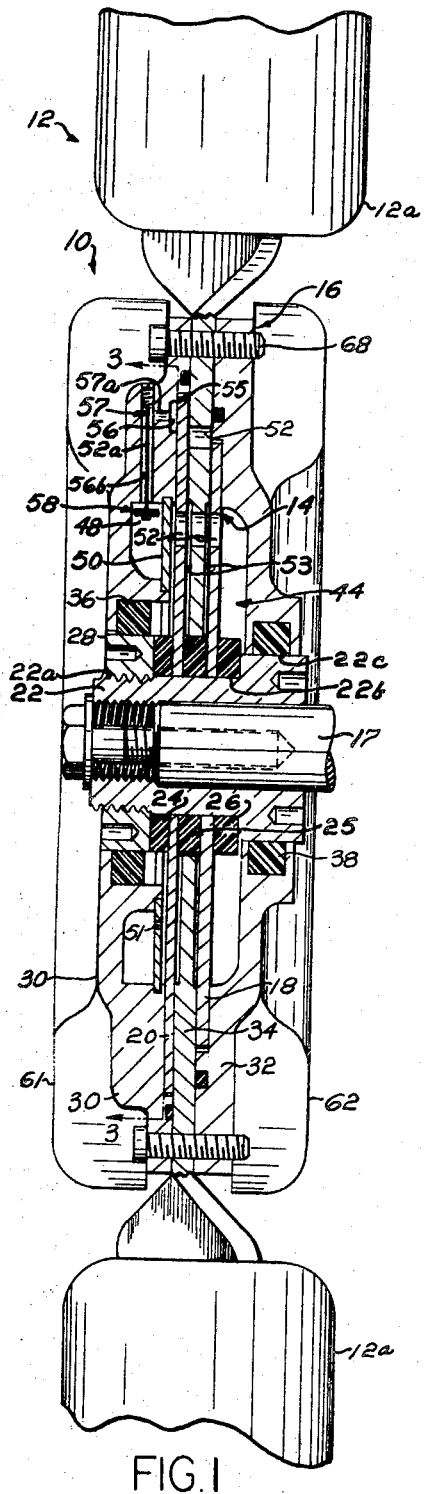
FIG. 1 is an axial sectional view of a fluid coupling embodying the present invention.

The present invention provides in general a fluid coupling wherein a viscous fluid shear medium cooperates with relatively rotatable input and output coupling members to transmit torque therebetween. The coupling disclosed herein is of a compact construction making it suitable for use where a limited mounting space is available. Moreover, the fluid coupling also is relatively inexpensive to manufacture, is capable of transmitting considerable torque, and provides for effective dissipation of heat generated therein. Although the fluid coupling according to the present invention is applicable for driving many different mechanisms, it is particularly suitable for driving engine accessories, such as a radiator cooling fan.

As representing a preferred embodiment of the present invention, a fluid coupling device 10 is shown in the drawings. The fluid coupling 10 includes an input or driving coupling member 14 and an output or driven coupling member 16. The input coupling member 14 is operatively connected to a drive shaft 17 and is driven thereby. The drive shaft 17 is, in the preferred embodiment, the water pump shaft of a motor vehicle. The drive shaft 17 is driven from the crankshaft of the vehicle motor by a suitable drive such as a belt drive. Rotation of drive shaft 17 produces a corresponding rotation of the input coupling member 14 which in turn drives the output coupling member 16 through a fluid shear medium between the coupling members. The output coupling member 16 surrounds the input coupling member 14 and drives a fan 12 interconnected therewith.

The input coupling member 14 in the embodiment disclosed in FIG. 1 comprises two spaced annular plates 18 and 20. Plates 18 and 20 are mounted on a base or sleeve 22 which is press fit onto the end of drive shaft 17. The plates 18 and 20 are resilient and are preferably constructed from spring steel. The sleeve 22 which carries the plates 18 and 20 is of stepped configuration providing sleeve portions 22a, 22b and 22c of decreasing outside diameters. The plates 18 and 20 are mounted on the intermediate sleeve portion 22b as are three washers 24, 25 and 26. The washers are preferably constructed from hard plastic and asbestos. The washer 25 is interposed between plates 18 and 20 and maintains them in a spaced relation. The washer 26 abuts against a shoulder portion 22d of the sleeve 22. A lock nut 28 is threaded onto threads provided on sleeve portion 22c into abutment with the washer 24. By adjusting lock nut 28 along the threaded portion 22c of the sleeve 22, the frictional engagement between the plates 18 and 20 and the washers 24, 25 and 26 can be varied for a purpose to be more fully described hereafter.

The output coupling member 16 is arranged to rotate relative to the input coupling member 14 and relative to the sleeve 22. The output coupling member 16 includes front and rear generally disc-shaped body or cover members 30 and 32, respectively. A plate-like spider member 34 is arranged between the cover members 30 and 32 and is an integral part of the fan 12. The body members 30 and 32 and spider 34 are secured in their assembled relationship as shown in FIG. 1 by suitable fastening devices 36 which extend through axially aligned holes in the respective members and interconnect the members so that they are concentrically aligned and rotate as a unit relative to the input coupling member 14 and the sleeve 22. The central portions of the body members 30 and 32 function as a base for the spider 34 having openings to accommodate the sleeve 22 and lock nut 28. Seals 36 and 38 are disposed in recesses provided adjacent the central openings in the cover members 30 and 32.

The output cover members 30 and 32 have recesses 40 and 42 formed in the sides thereof facing the spider 34. The recesses 40 and 42 receive the plates 20 and 18, respectively. The input coupling member 14 and, in particular, the plate members 18 and 20 thereof rotate in a working chamber 44 which is defined by a boundary including the interior surfaces of the output cover members 30 and 32 and the opposing sides and interior end portion of the spider 34.

Shear spaces 46 and 47 are provided in the working chamber 44 between the plates 20 and 18, respectively, and the output coupling member 16 and which spaces are adapted to receive a fluid shear medium which transmits torque from the input coupling member to the output coupling member. The shear space 46 is defined by shear surface 20a of the resilient plate 20 and opposing shear surfaces 30a and 34a of the cover member 30 and the spider member 34, respectively. The shear space 47 is defined by shear surface 18a of the resilient plate 18 and opposing spaced shear surfaces 34a and 32a of the spider 34 and body or cover member 32, respectively. Upon rotation of plates 18 and 20 of the input coupling member 14, the fluid in shear spaces 46 and 47 is dragged around and imparts rotation to the output coupling member 16.

Fluid for the coupling 10 is maintained in a fluid reservoir 48. The reservoir 48 is provided by an annular groove 48a intermediate the center bore and periphery of the output cover member 30. The groove 48a is closed along the portion thereof opposing plate 20 by a closure plate 50. Plate 50 is connected to the cover member 30 in any suitable manner and is sealed to prevent fluid leakage thereabout.

The fluid is directed from the fluid reservoir 48 into shear spaces 46 and 47 through an opening 51 in a plate 50. At start-up of the fluid coupling 10, most of the shear fluid is in the fluid reservoir 48. Centrifugal pressure acting on the fluid in reservoir 48 causes the fluid to flow through opening or openings 51 into the working chamber 44. This fluid flow condition continues until substantially all of the fluid is evacuated from reservoir 48 and is in shear spaces 46 and 47 at which time maximum fluid volume is established between the coupling members. The fluid in working chamber 44 is circulated into shear spaces 46 and 47 through openings 52 in the fan spider 34 and plates 18 and 20.

Figure 2:
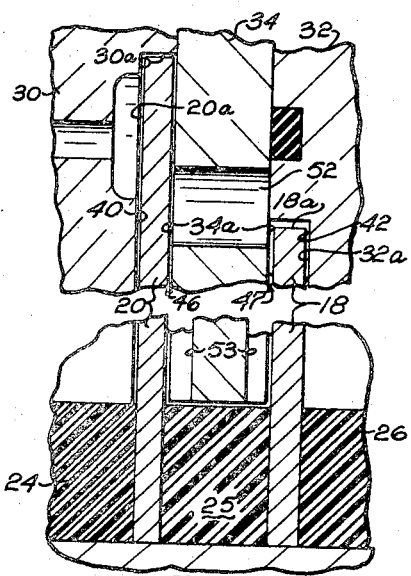
FIG. 2 is an enlarged sectional view of a portion of the coupling of FIG. 1.
Figure 4:
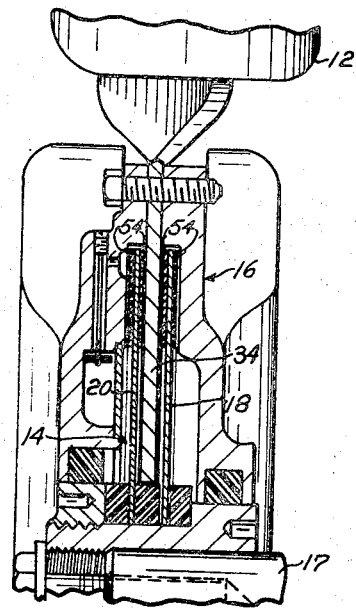
FIG. 4 is a partial view of the coupling of FIG. 1 and showing a modification thereof.

In the embodiment of the invention disclosed in FIGS. 1 and 2, the inner portion of the fan spider 34 is recessed as indicated at 53 to prevent frictional engagement between plates 18 and 20 and spider 34. Alternatively, friction pads 54 may be bonded to the opposite axial sides of plates 18 and 20 along their outer radii, as shown in FIG. 4. The pads 54 space the spider and plates, particularly at their inner radii, to avoid frictional engagement between the parts during operation.

The drive between the input and output coupling members is controlled so that when the temperature ambient to the coupling 10 is below a predetermined temperature, the drive to the fan 12 is substantially reduced. The fan 12 performs its usual function in the cooling system of a vehicle and, consequently, is not needed during cold operation of the vehicle engine. The drive is controlled by controlling the volume of shear fluid in shear spaces 46 and 47. The fluid is pumped from the working chamber 44 into the fluid reservoir 48 by a fluid conducting means 55.

Figure 3:
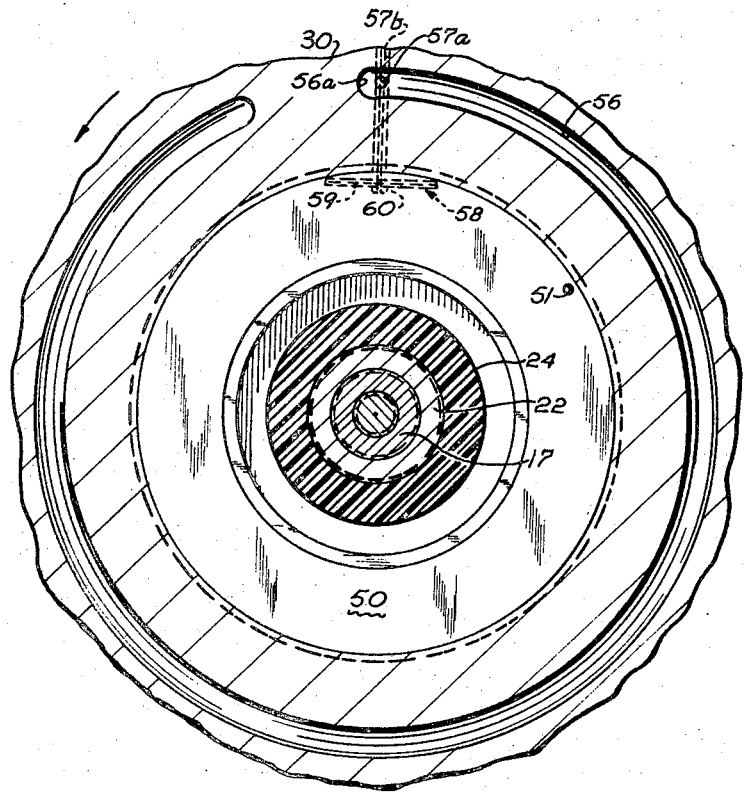
FIG. 3 is a sectional view taken substantially along line 3—3 of FIG. 1.

In the illustrated embodiment, the fluid conducting means 55 comprises a scoop groove 56 preferably cast into cover member 30 and a fluid passageway 57 communicating the scoop groove 56 and reservoir 48. Groove 56 extends substantially around the cover member 30, as shown in FIG. 3. Fluid in working chamber 44 enters groove 56 and is directed thereabout toward end 56a of the groove 56 during relative rotation of the coupling members. The passageway 57 has an axially extending portion 57a adjacent the end of groove 56 and into which fluid in groove 56 is directed. The axially extending portion 57a communicates with a radially extending portion 57b of passageway 57 which directs the fluid from the axial passageway into the reservoir 48. Fluid is continually pumped by groove 56 into passageways 57a and 57b and temperature responsive valve means 58 operates in response to the temperature in fluid reservoir 48 to open and close the radially extending passageway 57b.

The valve means 58 comprises a bimetal valve plate 59 which is mounted in fluid reservoir 48 adjacent the inner end of passageway 57b by a suitable support means 60. The metals selected for bimetal valve plate 59 are such that when the temperature in the fluid reservoir 48 is below a predetermined temperature, the valve plate 59 moves to the position shown in FIG. 3 and permits fluid to be evacuated by the groove 56 into reservoir 48. When the temperature in the fluid reservoir is at or exceeds the predetermined temperature, the bimetal valve plate 59 bows radially outwardly and closes passageway 57b to prevent fluid flow into reservoir 48. Thus, by controlling the flow of fluid from the working chamber 44 into the reservoir 48, the volume of fluid in the shear spaces 46 and 47 can be controlled to control the drive for the fan 12.

Alternatively, the groove 56 may be replaced by a pumping abutment which has an abutment surface extending axially from cover member 30 and arranged adjacent the axially extending passageway 57a. Fluid impacted against the abutment creates a back pressure on the fluid causing the fluid to enter the axially extending passageways 57a and 57b. This pumping abutment arrangement is similar in construction and operation to that disclosed in my United States Patent No. 3,263,783, issued Aug. 2, 1966.

The fan 12 further includes a plurality of fan blades 12a of conventional construction which are connected to the spider member 34 and are driven thereby to draw air through a radiator to cool the fluid therein. The drive arrangement heretofore described for the fan 12 provides for centering of the fan 12 as it is being driven to prevent wobbling of the fan. The input coupling member 14 normally rotates in a vertical plane but may deviate from the normal plane of rotation. The input coupling member includes a resilient part which due to its resilient character will transmit less wobble inducing forces to the fan 12. In the illustrated embodiment of FIGS. 1 and 2, the resilient part is provided by plates 18 and 20 which are preferably constructed from spring steel.

The coupling 10 according to the present invention further provides for effective dissipation of heat therefrom. The heat dissipation is provided in part by disposing the spider 34 between the plates 18 and 20 and constructing the spiders from a material having good heat conducting properties, such as aluminum, so that the surface 34a of the spider forms part of the boundary for the working chamber 44 and is thus exposed to the heat therein. The heat is conducted by the spider member 34 from the working chamber 44 to the blades 12a where it is dissipated by the air moving about the fan blades 12a. Further heat dissipation is provided by constructing the output coupling cover members 30 and 32 from material having good heat transfer properties, such as aluminum, and by providing cooling fins 61 and 62 on the periphery of the cover members 30 and 32, respectively.

Occasionally, fluid coupling devices of the type disclosed herein malfunction and, as a result, a substantially direct drive relationship is established between the coupling members. This causes overspeeding of the fan blades 12a. The direct drive relationship, for example, may be caused by gelatinization or polymerization of the shear fluid in shear spaces 46 and 47 caused by overheating thereof or a loss of fluid from the working chamber. In the former example, the silicone fluid becomes rubber-like and provides a friction material between the coupling members which impedes relative rotation therebetween. In the latter example, the metal-to-metal contact caused by the loss of fluid causes seizure between the coupling members. Fan overspeeding produces detrimental effects on the structure of the input and output coupling members and would require the structures to be constructed from high strength material.

The present invention overcomes fan overspeed by permitting the plates 18 and 20 of the input coupling member 14 to slip relative to the base or sleeve 22 and drive shaft 18 if the direct drive relationship occurs. The direct drive relationship causes increased resistance against rotation of the plates 18 and 20. Due to the aforedescribed connections of the plates to the sleeve 22, the plates 18 and 20 slip relative to the sleeve 22 when the force caused by the resistance against rotation reaches a predetermined magnitude. The point at which slippage occurs is set by the preloading force exerted by the lock nut 28 on the washers 24, 25 and 26 and on the plates 18 and 20. The greater the loading of the washers and plates, the greater the overload force required before the plate members 18 and 20 slip. Conversely, the smaller the loading force exerted by the lock nut 28, the smaller the resistance force required to produce slip. Providing such a slip arrangement permits the spider 34 and cover members 30, 32 to be constructed from material which is lower in strength but which has good heat transfer properties, such as aluminum.

Figure 5:
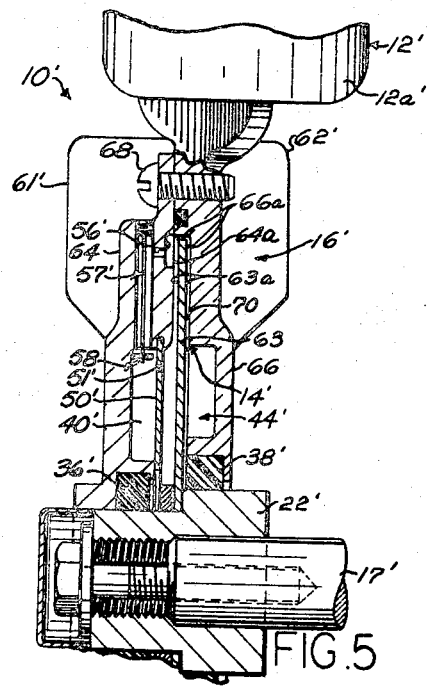
FIG. 5 is an axial sectional view of a fluid coupling according to the present invention and illustrating a further embodiment thereof.

The present invention further provides a modified coupling device which is illustrated in FIG. 5. In describing the fluid coupling of FIG. 5, the parts thereof which are similar and corresponding to parts of the fluid coupling 10 of FIG. 1 are designated with a common reference numeral with a prime mark added thereto.

The fluid coupling 10' comprises an input coupling member 14' and an output coupling member 16'. The input coupling member 14' comprises a single spring metal plate 63 which has a central aperture therein which receives a portion of the sleeve 22' to connect the plate 63 to the drive shaft 18'. The sleeve 22' has a step formed therein providing two sleeve portions of different outside diameters forming an abutment or radially extending shoulder therebetween. The plate member 63 is secured to the sleeve 22' by any appropriate means, such as by welding. Alternatively, the plate 63 can be mounted on the sleeve 22' to slip when a direct drive occurs between the plate 63 and the output coupling member 16'. Such an arrangement would be similar to the washer and lock nut arrangement disclosed in FIG. 1 for securing the plates 18 and 20 to the sleeve 22. The sleeve 22' is press fit onto the drive shaft 18' so that rotation of the drive shaft 18' causes the input coupling member 14' to rotate and, in turn, drive the output coupling member 16' and connect fan 12' through the shear fluid therebetween.

The output coupling member 16' comprises front and rear cover members 64 and 66. The cover members 64 and 66 are joined along their peripheries by fasteners 68 which extend through axially aligned openings in the members. The cover members 64 and 66 have a central aperture disposed therein to facilitate mounting on the sleeve 22'.

The fan spider 72 in this embodiment is formed integral with cover member 66, as shown in FIG. 5, and has fan blades 12a' connected thereto.

The output coupling member 16' rotates relative to the input coupling member 14' and the sleeve 22'. Teflon seals 36' and 38' act between the sleeve 22' and body members 64, 66 to prevent fluid leakage therethrough.

The output coupling member 16' defines a working chamber 44' within which the plate 63 is adapted to rotate and transmit drive to the output coupling member 16'. The plate 63 and the cover members 64 and 66 have spaced opposed shear surfaces 63a, 64a, and 66a, respectively, which define therebetween a shear space 70. The shear space 70 is adapted to receive fluid from a fluid reservoir 48' carried by the cover member 64 and operates to transmit torque from the plate 63 to the cover members 64 and 66 to drive the fan 12'.

The fluid is directed by centrifugal pressure from the reservoir 48' through opening 51' into the shear space 70 to transmit drive between the coupling members. The volume of fluid in shear space 70 is controlled by scoop groove 56', passageway 57' and bimetal valve means 58' in the same manner as explained in connection with the embodiment of FIG. 1.

In the fluid coupling embodiment disclosed in FIG. 5, heat is dissipated from the coupling through the blades 12a'. The cover member 66 which drives the blades 12a' forms a boundary for the working chamber 44' and conducts heat therethrough to the blades 12a' where it is dissipated to air passing about blades 12a'. The cover members 64 and 66 also are constructed from material having good heat transfer properties and having a plurality of integrally formed cooling fins 61' and 62' disposed about their peripheries. Heat is conducted through the cover members 64 and 66 and is dissipated by the fins 61' and 62' to the surrounding air.

The coupling device 10' also provides a drive for the fan 12' which minimizes wobble of fan 12'. The single spring metal plate 63 is disposed between the cover members 64 and 66 and due to its resilient character minimizes transmission of the wobble producing forces to the output coupling member 16'.

The fluid couplings 10 and 10' disclosed in FIGS. 1 and 5, respectively, employ no roller, ball or other types of anti-friction bearings for mounting the output coupling members 16 and 16' on the sleeves 22 and 22', respectively. However, a hydrodynamic fluid film builds up around the outside diameters of the plates 18, 20 and 63 during rotation and provides support for the output coupling members 16 and 16'. Suitable ball or roller bearing assemblies or needle bearings may be provided.

From the foregoing, it should be apparent that the present invention provides a fluid coupling which is inexpensive to manufacture, has a compact design and is effective to dissipate heat from the coupling while transmitting drive from an input coupling member to an output coupling member which has a fan mounted integrally therewith. The fluid couplings disclosed provide arrangements wherein the output coupling members and integral fans rotate in vertical planes and thereby avoid fan wobble. Also, the input coupling member is connected to the drive shaft so that it can slip when a direct drive relationship is established between the coupling members.

Although the embodiments of the present invention have been described in considerable detail, it is intended to cover all modifications, adaptations and arrangements which come within the scope of the appended claims.

Having described my invention, I claim:

1. A fluid coupling comprising relatively rotatable input and output coupling members, said output coupling member defining a substantially closed working chamber within which said input coupling member rotates, said coupling members having spaced opposed shear surfaces defining therebetween a shear space, said shear space adapted to receive a fluid shear medium which cooperates with said shear surfaces to transmit torque between said coupling members, and one of said coupling members including a resilient part having one shear surface disposed immediately adjacent and opposed to another shear surface on the other coupling member, said one of said coupling members being readily deflectable relative to said other coupling member to minimize the transmission of axial forces between said coupling members.

2. The fluid coupling as defined in claim 1 wherein said input coupling member includes a spring plate member providing said resilient part and defining said one shear surface.

3. The fluid coupling as defined in claim 1 wherein said resilient part is disposed immediately adjacent and opposed to a second surface of said other coupling member whereby wobble inducing forces resulting from deviation of said resilient part from its plane of rotation are not transmitted to said other coupling member.

4. The fluid coupling as defined in claim 1 wherein said input coupling member comprises a pair of axially spaced, spring plate members forming said resilient part and said output coupling member includes a radially extending part integral with said output coupling member and disposed between said spring plate members.

5. A fluid coupling comprising relatively rotatable input and output coupling members, said input coupling member adapted to be operatively connected to a drive shaft, said output coupling member defining a working chamber within which said input coupling member is disposed, said coupling members having spaced opposed shear surfaces defining a shear space therebetween, said shear surfaces cooperating with a fluid shear medium in said shear space to transmit torque between said coupling members, and releasable means operatively connecting said input coupling member to said drive shaft and releasable to permit said input coupling member to slip relative to said drive shaft in response to a condition of operation of said coupling.

6. The fluid coupling as defined in claim 5 wherein said releasable means comprises washer means arranged to exert an axial compressive force on said input coupling member to releasably connect said input coupling member to said drive shaft, and means preloading said washer means to permit said output coupling member to slip relative to said drive shaft when a direct drive relationship exists between said coupling members.

7. The fluid coupling as defined in claim 5 wherein said input coupling member includes a pair of axially spaced, radially extending plate members and said releasable means connecting said input coupling member to said drive shaft including a sleeve fixed to said drive shaft, said sleeve having first and second peripheral portions of different diameters defining a radially extending shoulder therebetween, a plurality of washers on said second peripheral portion which is smaller in diameter than said first portion, said washers being arranged on opposite sides of said plate members, and means preloading said washers so that one of said washers abuts said shoulder and the washers exert an axial compressive force on said plate members to permit said plate members to slip relative to said sleeve in response to a condition of operation of said fluid coupling.

8. A fluid coupling comprising relatively rotatable input and output coupling portions, said input coupling portion including a pair of axially spaced apart plates, said output coupling portion defining a substantially closed working chamber within which said plates are adapted to rotate, said output coupling portion including a part extending between said spaced apart plates and having opposite shear surfaces cooperating with shear surfaces on said plates and at least partially defining therebetween a shear space, said shear space being adapted to receive a fluid shear medium to transmit torque between said plates and said part, a reservoir means for holding said fluid shear medium, passage means connecting said reservoir means in fluid communication with said shear space, valve means for regulating the flow of said fluid medium through said passage means, a plurality of fan blades arranged exteriorly of said output coupling portion and adapted to move air thereabout upon being driven, said blades forming an integral unit with said part whereby heat from said working chamber is dissipated by said blades.

9. A fluid coupling as set forth in claim 8 wherein at least one of said part and pair of plates is formed of a resilient material so that said one of said part and pair of plates is readily deflectable relative to the others of said part and pair of plates whereby the transmission of wobble inducing forces between said input and output coupling members is minimized.

10. A fluid coupling as set forth in claim 8 wherein said plates are formed of a resilient material and are readily deflectable relative to said part to thereby minimize the transmission of wobble inducing forces between said input and output coupling portions.

11. A fluid coupling assembly comprising an input coupling portion adapted to be operatively connected to a drive shaft and to be driven thereby, and an output coupling portion at least partially defining a working chamber adapted to hold a fluid shear medium, one of said coupling portions including a first drive plate means having a pair of axially spaced apart plates, another of said coupling portions including a second drive plate means located between the plates of said first drive plate means, said first and second drive plate means having opposing shear surfaces which cooperate with said fluid shear medium to transmit torque between said coupling portions, one of said first and second drive plate means being formed of a resilient material which enables said one drive plate means to be readily deflected by an interaction between said first and second drive plate means during operation of said fluid coupling assembly to thereby minimize the transmission of axial forces between said coupling portions.

12. A fluid coupling assembly as set forth in claim 11 further including releasable means operatively connecting one of said first and second drive plate means to said drive shaft and releasable to permit said input coupling portion to slip relative to said drive shaft in response to a condition of operation of said fluid coupling assembly.

13. A fluid coupling assembly comprising an input coupling portion adapted to be operatively connected to a drive shaft and driven thereby, and an output coupling portion at least partially defining a working chamber adapted to hold a fluid shear medium, one of said coupling portions including a first drive plate means mounted on a first base, another of said coupling portions including a second drive plate means mounted on a second base, said first and second drive plate means having opposing shear surfaces which cooperate with said fluid shear medium to transmit torque between said coupling portions, one of said first and second drive plate means including releasable means operatively connecting said one drive plate means to its associated base, said releasable means being operative upon the transmission of a predetermined amount of torque between said input and output coupling portions to release said one drive plate means for movement relative to its associated base to thereby limit the torque transmitting capability of said fluid coupling assembly.

14. A fluid coupling comprising a drive shaft, relatively rotatable input and output coupling members, said output coupling member comprising a pair of body members and defining a substantially closed working chamber within which said input coupling member is arranged to rotate, said coupling members having opposed spaced shear surfaces defining therebetween a shear space, said shear space adapted to receive a fluid shear medium which cooperates with said shear surfaces to transmit torque between said coupling members, a plurality of fan blades arranged exteriorly of said output coupling member and adapted to move air thereabout upon being driven, said blades being integral with and forming a one-piece unit with a part disposed between said body members and exposed to said working chamber, means interconnecting said body members and said part, said part having a surface providing at least a portion of said shear surface and being formed of heat conducting material whereby heat in said working chamber is dissipated by said fan blades, and means providing a releasable connection between said plates of said input coupling member and said drive shaft and releasable to permit said plates to slip relative to said drive shaft.

References Cited

UNITED STATES PATENTS

| | | |
|---|---|---|
| 923,565 | 6/1909 | Newcomb. |
| 2,954,857 | 10/1960 | Palm. |
| 3,155,209 | 11/1964 | Weir _____ 230—270 |

ROBERT M. WALKER, *Primary Examiner.*